(12) United States Patent
Huang et al.

(10) Patent No.: US 11,767,712 B2
(45) Date of Patent: Sep. 26, 2023

(54) WINDOW SHADE AND ACTUATING SYSTEM THEREOF

(71) Applicant: Teh Yor Co., Ltd., New Taipei (TW)

(72) Inventors: Chung-Chen Huang, New Taipei (TW); Chin-Tien Huang, New Taipei (TW); Kuan-Yu Liu, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 116 days.

(21) Appl. No.: 17/146,964

(22) Filed: Jan. 12, 2021

(65) Prior Publication Data
US 2021/0222489 A1 Jul. 22, 2021

Related U.S. Application Data

(60) Provisional application No. 62/961,887, filed on Jan. 16, 2020.

(51) Int. Cl.
| E06B 9/322 | (2006.01) |
| E06B 9/262 | (2006.01) |
| F16D 11/14 | (2006.01) |

(52) U.S. Cl.
CPC ........... *E06B 9/322* (2013.01); *E06B 9/262* (2013.01); *F16D 11/14* (2013.01); *E06B 2009/2625* (2013.01)

(58) Field of Classification Search
CPC .. E06B 9/322; E06B 9/262; E06B 2009/2625; E06B 2009/2627; E06B 9/326;
(Continued)

(56) References Cited

U.S. PATENT DOCUMENTS 9,187,951 B2 * 11/2015 Yu ............................. E06B 9/78
RE48,355 E 12/2020 Chen et al.
(Continued)

FOREIGN PATENT DOCUMENTS

| AU | 2006200861 B2 | 4/2011 |
| EP | 3199742 A1 | 8/2017 |

OTHER PUBLICATIONS

Taiwanese Office Action, dated Aug. 12, 2021, in a counterpart Taiwanese patent application, No. TW 110101531. (English translation of the search report is attached.).
(Continued)

*Primary Examiner* — Abe Massad
*Assistant Examiner* — Matthew R. Shepherd
(74) *Attorney, Agent, or Firm* — Chen Yoshimura LLP

(57) ABSTRACT

An actuating system includes an actuating wheel coupled to an operating element, an axle coupling part disposed substantially coaxial to the actuating wheel and rotatable for raising or lowering a bottom part of a window shade, and a clutching part carried with a carrier and movably linked to the actuating wheel. The clutching part is movable between a retracted state for disengaging from the axle coupling part and an extended state for engaging with the axle coupling part. The actuating wheel is rotatable in a first direction to urge the clutching part to move from the retracted state to the extended state and drive the carrier and the axle coupling part to rotate in unison, and in a second direction to urge the clutching part to move from the extended state to the retracted state so that the actuating wheel is rotationally decoupled from the axle coupling part.

17 Claims, 16 Drawing Sheets

(58) Field of Classification Search
CPC ...... E06B 9/78; E06B 2009/785; F16D 11/14; F16D 2125/28; F16D 2125/30; F16D 41/06
See application file for complete search history.

(56) References Cited

U.S. PATENT DOCUMENTS

| | | | | |
|---|---|---|---|---|
| 2006/0096826 A1* | 5/2006 | Murrell | .................. | F16D 41/06 192/38 |
| 2006/0191650 A1* | 8/2006 | Takebayashi | ............. | E06B 9/78 160/320 |
| 2012/0080285 A1* | 4/2012 | Chen | ....................... | F16D 11/14 192/71 |
| 2012/0285632 A1* | 11/2012 | Kataoka | .................. | E06B 9/262 160/126 |
| 2014/0290871 A1* | 10/2014 | Muto | ...................... | E06B 9/262 160/84.01 |
| 2015/0007946 A1* | 1/2015 | Yu | ........................... | E06B 9/322 160/84.02 |
| 2015/0354275 A1* | 12/2015 | Huang | .................... | E06B 9/324 160/368.1 |
| 2016/0010390 A1* | 1/2016 | Smith | ...................... | E06B 9/42 160/315 |
| 2016/0017964 A1* | 1/2016 | Yu | ............................. | E06B 9/32 160/168.1 P |
| 2017/0108052 A1* | 4/2017 | Littlefield | ............... | F16D 11/14 |
| 2017/0218696 A1 | 8/2017 | Chen et al. | | |
| 2017/0218697 A1 | 8/2017 | Chen et al. | | |
| 2017/0218698 A1 | 8/2017 | Chen et al. | | |
| 2017/0218703 A1 | 8/2017 | Chen et al. | | |
| 2019/0170198 A1* | 6/2019 | Kimes | .................. | F16H 63/304 |
| 2021/0277712 A1* | 9/2021 | Huang | .................... | E06B 9/322 |

OTHER PUBLICATIONS

International Search Report in the parent PCT application No. PCT/US2021/013047, dated May 4, 2021.
Written Opinion in the parent PCT application No. PCT/US2021/013047, dated May 4, 2021.

* cited by examiner

WINDOW SHADE AND ACTUATING SYSTEM THEREOF

CROSS-REFERENCE TO RELATED APPLICATION(S)

This application claims priority to U.S. provisional patent application No. 62/961,887 filed on Jan. 16, 2020, the disclosure of which is incorporated herein by reference.

BACKGROUND

1. Field of the Invention

The present invention relates to window shades, and actuating systems used in window shades.

2. Description of the Related Art

Some window shades may use an operating cord for raising a bottom part of the window shade and a wand for lowering the bottom part. More specifically, the operating cord may be pulled downward to drive a rotary part in rotation, which can be transmitted to a drive axle so that the drive axle can rotate for winding a suspension cord connected with the bottom part. When a user rotates the wand, an arrester coupled to the wand can release the drive axle, which can accordingly rotate as the bottom part lowers under gravity action.

The aforementioned type of window shades usually requires a control system that can couple the rotary part to the drive axle when the operating cord is operated by the user and decouple the rotary part from the drive axle when the wand is operated by the user. However, some existing control systems may be relatively complex in construction and have reliability problems.

Therefore, there is a need for an improved actuating system that can be used in window shades and address at least the foregoing issues.

SUMMARY

The present application describes a window shade and an actuating system for use with the window shade that can address the foregoing issues.

According to an embodiment, the actuating system includes an actuating wheel rotatable about a pivot axis and coupled to an operating element, the operating element being operable to drive the actuating wheel in rotation, an axle coupling part disposed substantially coaxial to the actuating wheel and rotatable for raising or lowering a bottom part of a window shade, a carrier rotatable about the pivot axis, and a clutching part carried with the carrier and movably linked to the actuating wheel. The clutching part is movable relative to the carrier between a retracted state for disengaging from the axle coupling part and an extended state for engaging with the axle coupling part. The actuating wheel is rotatable in a first direction to urge the clutching part to move from the retracted state to the extended state and drive the carrier and the axle coupling part to rotate in unison, and in a second direction opposite to the first direction to urge the clutching part to move from the extended state to the retracted state so that the actuating wheel is rotationally decoupled from the axle coupling part.

Moreover, the application describes a window shade that incorporates the actuating system.

DETAILED DESCRIPTION OF THE EMBODIMENTS

Figure 1:
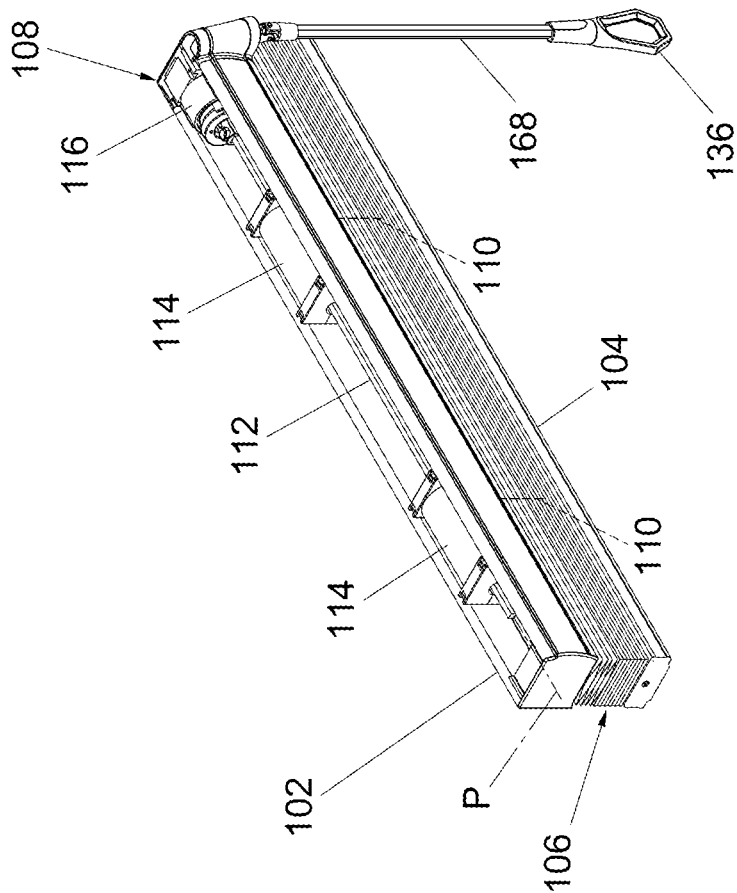
FIG. 1 is a perspective view illustrating an embodiment of a window shade.
Figure 2:
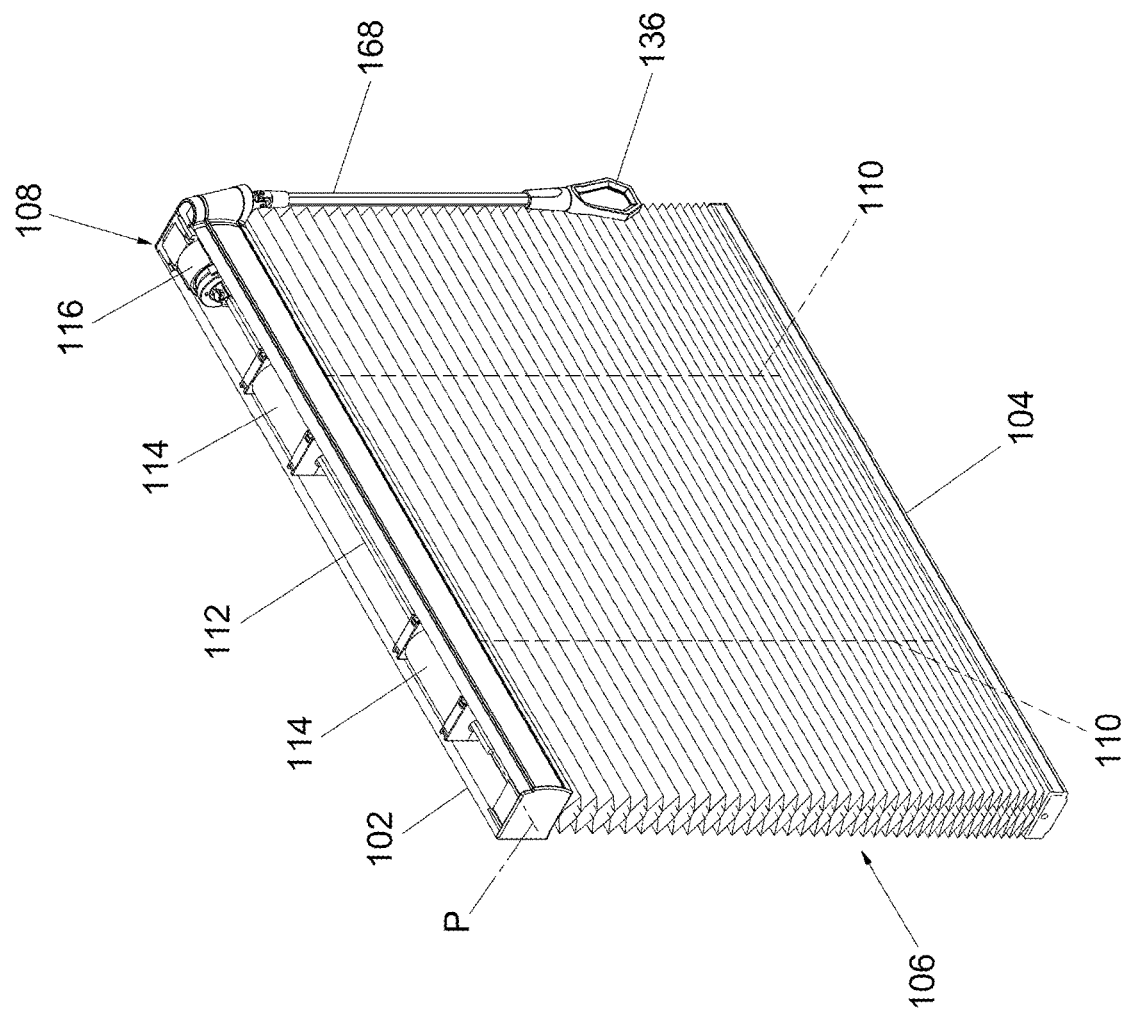
FIG. 2 is a perspective view illustrating the window shade having a bottom part lowered from a head rail.

FIGS. 1 and 2 are two perspective views respectively illustrating an embodiment of a window shade 100 in different states. Referring to FIGS. 1 and 2, the window shade 100 can include a head rail 102, a bottom part 104, a shading structure 106 and an actuating system 108.

The head rail 102 may be affixed at a top of a window frame, and can have any desirable shapes. According to an example of construction, the head rail 102 can have an elongate shape including a cavity for at least partially receiving the actuating system 108 of the window shade 100.

The bottom part 104 can be suspended from the head rail 102 with a plurality of suspension elements 110 (shown with phantom lines in FIGS. 1 and 2). According to an example of construction, the bottom part 104 may be an elongate rail having a channel adapted to receive to the attachment of the shading structure 106. Examples of the suspension elements 110 may include, without limitation, cords, strips, bands, and the like.

The shading structure 106 may exemplary have a cellular structure, which may include, without limitation, honeycomb structures. However, it will be appreciated that the shading structure 106 may have any suitable structure that can be expanded and collapsed between the bottom part 104 and the head rail 102. The shading structure 106 can be disposed between the head rail 102 and the bottom part 104, and can have two opposite ends respectively attached to the head rail 102 and the bottom part 104.

Referring to FIGS. 1 and 2, the bottom part 104 is movable vertically relative to the head rail 102 for setting the window shade 100 to a desirable configuration. For example, the bottom part 104 may be raised toward the head rail 102 to collapse the shading structure 106 as shown in FIG. 1, or lowered away from the head rail 102 to expand the shading structure 106 as shown in FIG. 2. The vertical position of the bottom part 104 relative to the head rail 102 may be controlled with the actuating system 108.

Referring to FIGS. 1 and 2, the actuating system 108 is assembled with the head rail 102, and is operable to displace the bottom part 104 relative to the head rail 102 for adjustment. The actuating system 108 can include a transmission axle 112, a plurality of winding units 114 rotationally coupled to the transmission axle 112, and a control module 116 coupled to the transmission axle 112.

The transmission axle 112 is respectively coupled to the winding units 114, and can rotate about a pivot axis P. Each of the winding units 114 is respectively connected with the bottom part 104 via one suspension element 110, and is operable to wind the suspension element 110 for raising the bottom part 104 and to unwind the suspension element 110 for lowering the bottom part 104. For example, the winding unit 114 may include a rotary drum (not shown) that is rotationally coupled to the transmission axle 112 and is connected with one end of the suspension element 110, and another end of the suspension element 110 can be connected with the bottom part 104, whereby the rotary drum can rotate along with the transmission axle 112 to wind or unwind the suspension element 110. Since the winding units 114 are commonly coupled to the transmission axle 112, the winding units 114 can operate in a concurrent manner for winding and unwinding the suspension elements 110.

Figure 3:
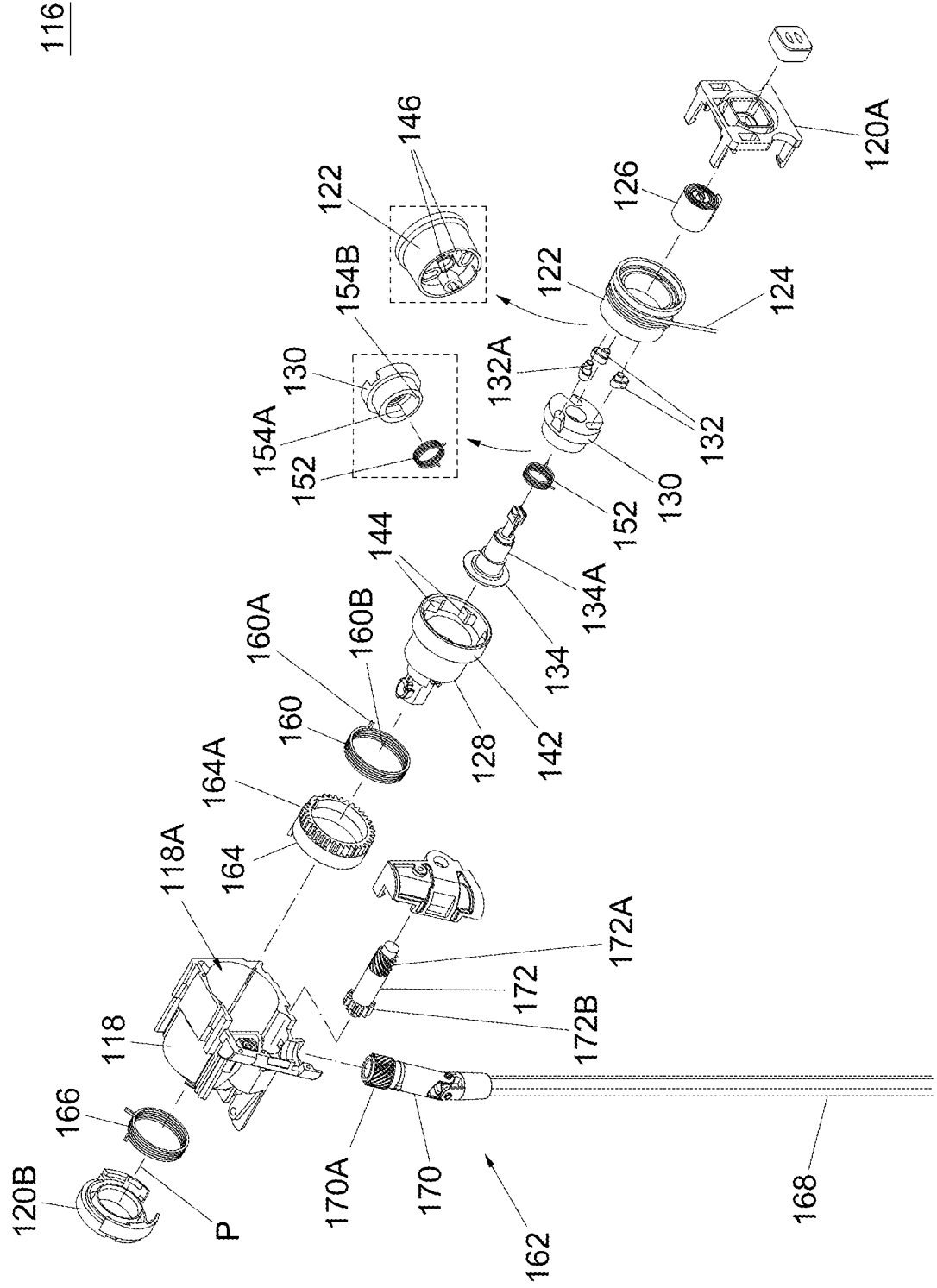
FIG. 3 is an exploded view illustrating a control module of an actuating system provided in the window shade.
Figure 4:
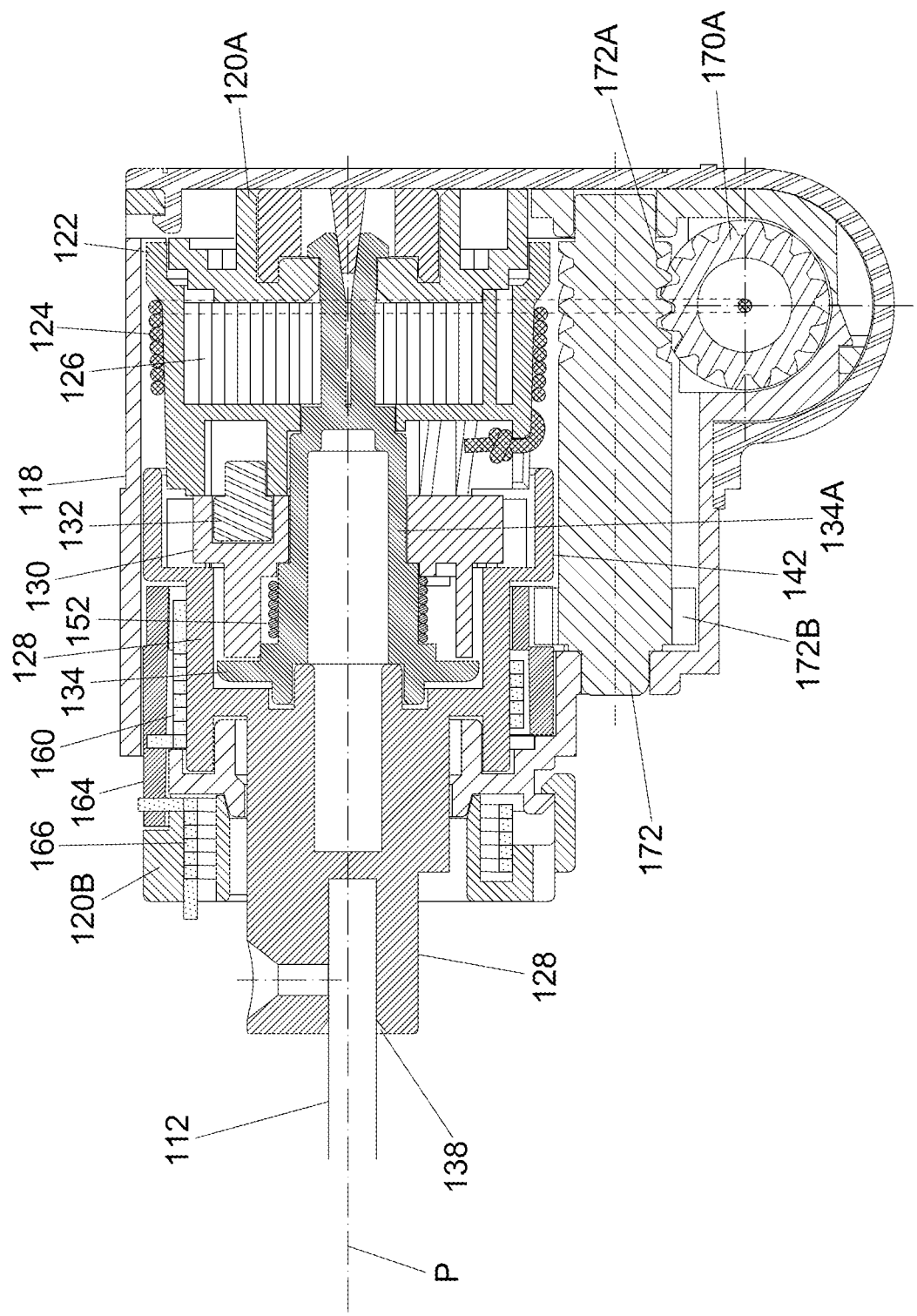
FIG. 4 is a cross-sectional view illustrating the control module of the actuating system provided in the window shade.
Figure 5:
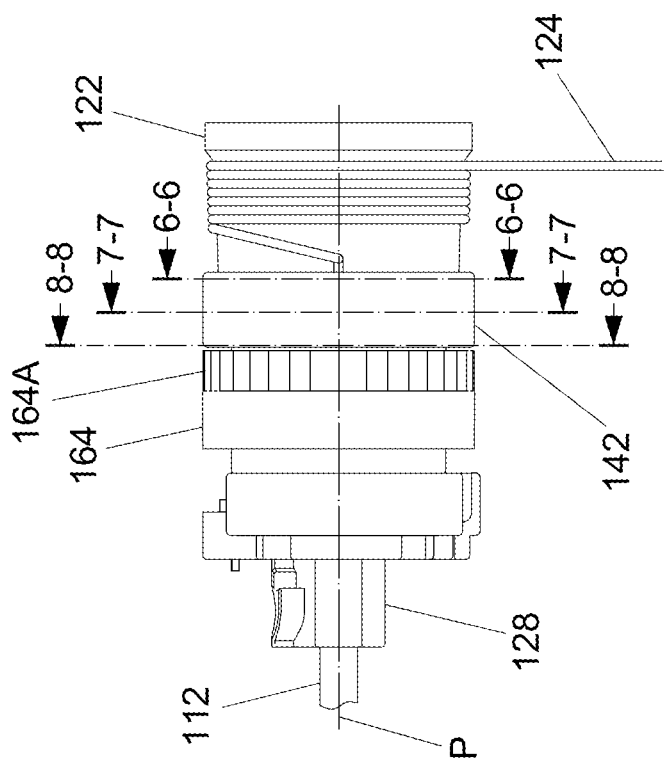
FIG. 5 is a side view illustrating the control module without a housing.
Figure 6:
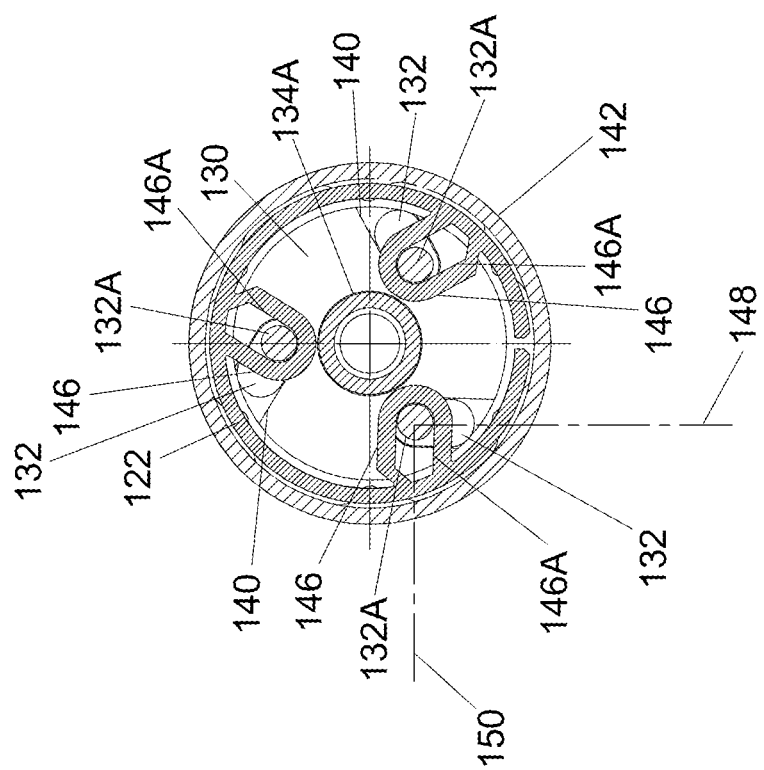
FIG. 6 is a cross-sectional view taken along section plane 6-6 shown in FIG. 5.
Figure 7:
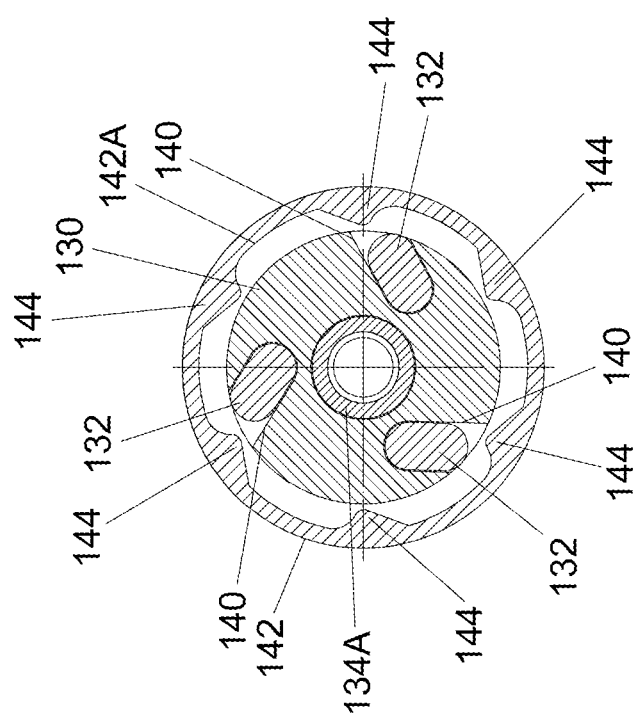
FIG. 7 is a cross-sectional view taken along section plane 7-7 shown in FIG. 5.
Figure 8:
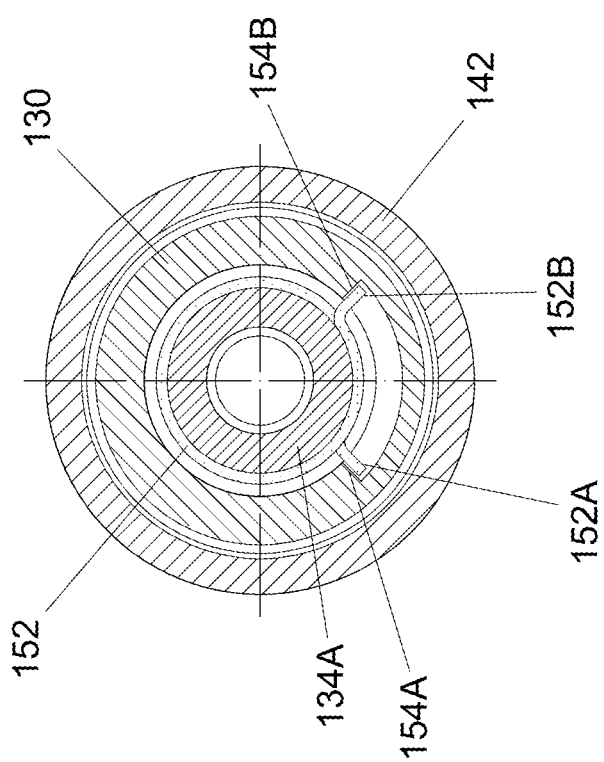
FIG. 8 is a cross-sectional view taken along section plane 8-8 shown in FIG. 5.

The control module 116 is coupled to the transmission axle 112, and is operable to cause the transmission axle 112 to rotate in either direction about the pivot axis P for raising or lowering the bottom part 104. In conjunction with FIGS. 1 and 2, FIG. 3 is an exploded view illustrating a construction of the control module 116, and FIG. 4 is a cross-sectional view of the control module 116. Referring to FIGS. 1-4, the control module 116 can include a housing 118 that can be affixed to the head rail 102. The housing 118 can have a cavity 118A adapted to receive at least some component parts of the control module 116, wherein the cavity 118A can be respectively closed at a first side with a bracket 120A and at a second side opposite to the first side with a cover 120B. FIG. 5 is a side view illustrating the control module 116 without the housing 118, FIG. 6 is a cross-sectional view taken along section plane 6-6 shown in FIG. 5, FIG. 7 is a cross-sectional view taken along section plane 7-7 shown in FIG. 5, and FIG. 8 is a cross-sectional view taken along section plane 8-8 shown in FIG. 5.

Referring to FIGS. 3-8, the control module 116 can include an actuating wheel 122, an operating element 124, a spring 126, an axle coupling part 128, a carrier 130 and a plurality of clutching parts 132.

Referring to FIGS. 3 and 4, the actuating wheel 122 can be disposed inside the cavity 118A of the housing 118 substantially coaxial to the transmission axle 112. For example, the bracket 120A can be fixedly connected with a pivot mount 134 having a fixed shaft 134A, and the actuating wheel 122 can be pivotally connected around one section of the fixed shaft 134A so as to be rotatable about the pivot axis P of the transmission axle 112.

The operating element 124 is a flexible element, and is coupled to the actuating wheel 122. Examples of the operating element 124 can include, without limitation, a cord, a strip, a band, and the like. The operating element 124 can have one end connected with the actuating wheel 122, and another end connected with a handle 136 (better shown in FIGS. 1 and 2) that is exposed outside the head rail 102 for operation by a user. The operating element 124 is thereby operable to drive the actuating wheel 122 in rotation, wherein the actuating wheel 122 is rotatable to wind and unwind at least partially the operating element 124. For example, the operating element 124 can be at least partially unwound from the actuating wheel 122 when the actuating wheel 122 rotates in a first direction, and at least partially wound around the actuating wheel 122 when the actuating wheel 122 rotates in a second direction opposite to the first direction. In the actuating system 108 described herein, the operating element 124 can be operable to drive the actuating wheel 122 in rotation for raising the bottom part 104 of the window shade 100.

Referring to FIGS. 3 and 4, the spring 126 can be disposed inside a cavity of the actuating wheel 122, and can bias the actuating wheel 122 to rotate for winding at least partially the operating element 124. According to an example of construction, the spring 126 may be a ribbon spring that is respectively connected with the fixed shaft 134A and the actuating wheel 122.

The axle coupling part 128 is received at least partially inside the cavity 118A of the housing 118, and can extend outward through the cover 120B. The axle coupling part 128 is disposed substantially coaxial to the actuating wheel 122, and is rotationally coupled to the transmission axle 112. For example, the axle coupling part 128 can be pivotally connected about the fixed shaft 134A, the transmission axle 112 can have an end that is received in an opening 138 provided in the axle coupling part 128, and a fastener (not shown) can be used to attach the transmission axle 112 to the axle coupling part 128. The transmission axle 112 and the axle coupling part 128 can thereby rotate in unison about the pivot axis P for raising or lowering the bottom part 104 of the window shade 100.

The carrier 130 is disposed inside the cavity 118A of the housing 118 axially adjacent to the actuating wheel 122 and the axle coupling part 128, and is rotatable about the pivot axis P as a single part. For example, the carrier 130 can have a hole through which the fixed shaft 134A is disposed for pivotally connecting the carrier 130 about the fixed shaft 134A.

Referring to FIGS. 3-8, the clutching parts 132 are carried with the carrier 130, and are movable relative to the carrier 130 between a retracted state for disengaging from the axle coupling part 128 and an extended state for engaging with the axle coupling part 128. For example, the clutching parts 132 may be connected with the carrier 130 so as to be movable generally orthogonal to the pivot axis P between the retracted state and the extended state. According to an example of construction, the clutching parts 132 can be respectively connected slidably with the carrier 130, and can be disposed distant from the pivot axis P at different angular positions on the carrier 130. For example, the carrier 130 can have a plurality of channels 140 that are disposed at different angular positions distant from the pivot axis P and are opened on a circumference of the carrier 130, and the clutching parts 132 can be respectively guided for sliding movement in the channels 140. The clutching parts 132 can thereby slide relative to the carrier 130 generally orthogonal to the pivot axis P to protrude outward from the circumference of the carrier 130 in the extended state or retract toward the interior of the carrier 130 in the retracted state. Moreover, the clutching parts 132 can move along with the carrier 130 around the pivot axis P when the carrier 130 rotates about the pivot axis P.

According to an example of construction, the axle coupling part 128 can include a sleeve 142 having a plurality of teeth 144 protruding inward from an inner wall 142A of the sleeve 142, and the carrier 130 can be at least partially received inside the sleeve 142. The clutching parts 132 can respectively engage with the teeth 144 in the extended state, and can respectively disengage from the teeth 144 in the retracted state.

Referring to FIGS. 3-8, the clutching parts 132 are movably linked to the actuating wheel 122 so that a rotation of the actuating wheel 122 in either direction can switch the clutching parts 132 between the retracted state and the extended state. According to an example of construction, the actuating wheel 122 can have a plurality of driving portions 146 respectively projecting inward at different eccentric locations relative to the pivot axis P, and the clutching parts 132 can be respectively connected slidably with the driving portions 146 in a region distant from the pivot axis P. The driving portions 146 can be fixedly connected with the actuating wheel 122, e.g., by forming the driving portions 146 integrally with the actuating wheel 122. Each of the driving portions 146 can have a guide slot 146A, and each of the clutching parts 132 can have a pin 132A that is slidably received in the guide slot 146A of the corresponding driving portion 146. The driving portions 146 of the actuating wheel 122 can be disposed so that the guide slots 146A respectively overlap at least partially with the channels 140 of the carrier 130. Moreover, the mutually-overlapping channel 140 and guide slot 146A can extend in different directions, e.g., the channel 140 can extend along an axis 148, and the guide slot 146A can extend along an axis 150 that is tilted an angle relative to the axis 148. In this manner, the rotation of the actuating wheel 122 in either direction can urge the clutching parts 132 to concurrently slide relative to the carrier 130 for switching between the retracted state and the extended state.

Referring to FIGS. 3-8, a resisting spring 152 can be provided adjacent to the carrier 130. The resisting spring 152 can be a coiled spring having two prongs 152A and 152B, and can be disposed in tight contact with a circumference of the fixed shaft 134A. The carrier 130 can have a peripheral region provided with two flange surfaces 154A and 154B that can respectively contact with the two prongs 152A and 152B of the resisting spring 152. The frictional contact between the resisting spring 152 and the fixed shaft 134A can assist in holding the carrier 130 for facilitating a movement of the clutching parts 132 between the retracted state and the extended state. Once the clutching parts 132 reach the extended state or the retracted state and the carrier 130 is urged to rotate along with the actuating wheel 122 in the first or second direction, a pressure that is applied by the flange surface 154A or 154B of the carrier 130 on the prong 152A or 152B of the resisting spring 152 can cause the resisting spring 152 to loosen its frictional contact with the fixed shaft 134A so that the resisting spring 152 can move along with the carrier 130 around the fixed shaft 134A.

With the aforementioned construction, the actuating wheel 122 is rotatable in a first direction to urge the clutching parts 132 to move from the retracted state to the extended state and drive the carrier 130 and the axle coupling part 128 to rotate in unison, and in a second direction opposite to the first direction to urge the clutching parts 132 to move from the extended state to the retracted state so that the actuating wheel 122 is rotationally decoupled from the axle coupling part 128. The actuating wheel 122 can be rotated in the first direction by pulling the operating element 124, which can be used for raising the bottom part 104 of the window shade 100. When the operating element 124 is released, the spring 126 can urge the actuating wheel 122 to rotate in the second direction for winding the operating element 124.

Referring to FIGS. 3 and 4, the control module 116 of the actuating system 108 can further include a braking spring 160 and a brake release unit 162. The braking spring 160 has two prongs 160A and 160B, and is disposed tightly around the axle coupling part 128 with the prong 160A anchored to the housing 118. A frictional contact between the braking spring 160 and a peripheral surface of the axle coupling part 128 can prevent the axle coupling part 128 and the transmission axle 112 from rotating so that the bottom part 104 can be held in a desired position relative to the head rail 102.

The brake release unit 162 is connected with the prong 160B of the braking spring 160, and is operable to cause the braking spring 160 to loosen its frictional contact with the axle coupling part 128. According to an example of construction, the brake release unit 162 can include a collar 164, a spring 166, a control wand 168, and a plurality of transmission elements 170 and 172.

The collar 164 can be connected with the prong 160B of the braking spring 160, and can be disposed substantially coaxial to the axle coupling part 128. More specifically, the collar 164 can be pivotally assembled in the housing 118 so as to be rotatable about the pivot axis P. According to an example of construction, the collar 164 can have a circular shape. However, other shapes may be suitable, e.g., a semicircular shape, a curved shape, and the like. The collar 164 can rotate between an initial position and a release position for modifying the state of the braking spring 160: the braking spring 160 can tighten around the axle coupling part 128 for holding the bottom part 104 in position when the collar 164 is in the initial position, and the braking spring 160 can enlarge and loosen its frictional contact with the axle coupling part 128 so that the bottom part 104 can lower under gravity when the collar 164 rotates from the initial position to the release position.

The spring 166 is connected with the collar 164, and is operable to bias the collar 164 toward the initial position. According to an example of construction, the spring 166 may have one end anchored to the housing 118 or the cover 120B, and another end connected with a flange provided on the collar 164.

The control wand 168 can be connected with the collar 164 via the transmission elements 170 and 172, and can extend outside the housing 118 for operation. For example, the transmission element 170 can have a gear portion 170A and can be pivotally connected with an end of the control wand 168, and the transmission element 172 can have a first gear portion 172A meshed with the gear portion 170A of the transmission element 170 and a second gear portion 172B meshed with a toothed portion 164A of the collar 164. According to an example of construction, the transmission elements 170 and 172 can be pivotally connected with the housing 118 about pivot axes that are substantially perpendicular to each other. For example, the pivot axis of the transmission element 172 can be substantially parallel to the pivot axis P, and the pivot axis of the transmission element 170 can be inclined relative to a vertical axis. Accordingly, the control wand 168 can be rotated about its lengthwise axis to cause the collar 164 to rotate from the initial position to the release position and thereby urge the braking spring 160 to loosen its frictional contact with the axle coupling part 128. When a user releases the control wand 168, the spring 166 can urge the collar 164 to rotate reversely from the release position to the initial position.

According to an example of construction, the control wand 168 can have a hollow interior, and the operating element 124 can extend through the hollow interior of the control wand 168. This may prevent the risk of child strangle by the operating element 124.

Figure 9:
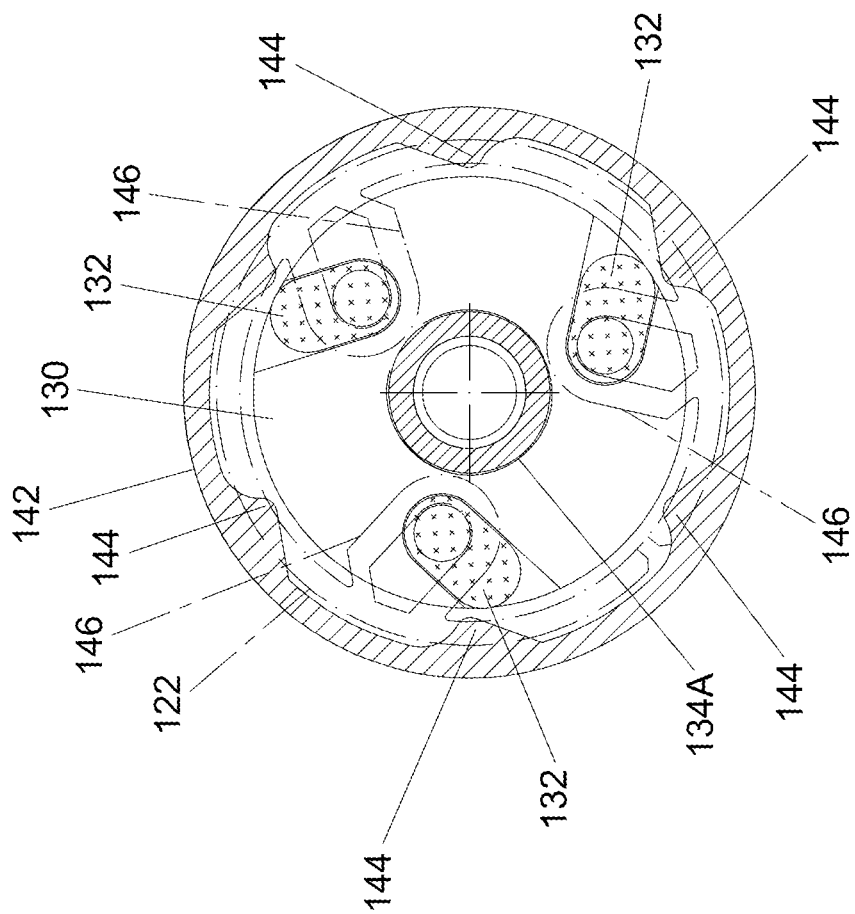
FIG. 9 is a partial cross-sectional view illustrating clutching parts provided in the control module in a retracted state.
Figure 10:
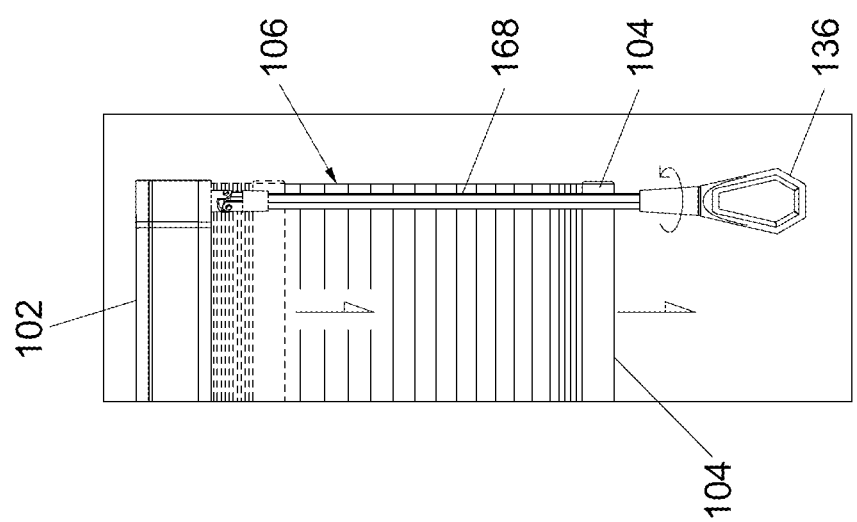
FIG. 10 is a schematic view illustrating exemplary operation for lowering the bottom part of the window shade.
Figure 11:
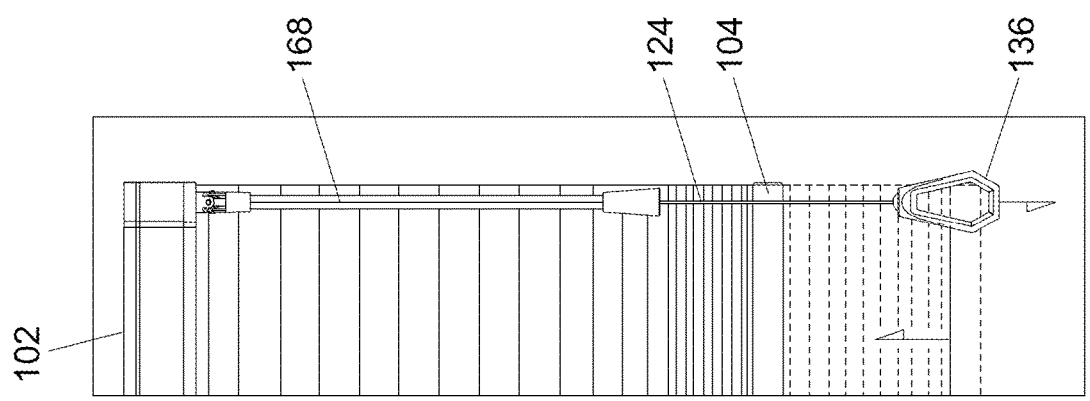
FIG. 11 is a schematic view illustrating exemplary operation for raising the bottom part of the window shade.

Referring to FIGS. 1 and 3-8, when the operating element 124 is not manipulated by a user, the braking spring 160 can tighten around the axle coupling part 128 to block rotation of the transmission axle 112, and the bottom part 104 and the shading structure 106 can be accordingly held at a fixed position. Meanwhile, the clutching parts 132 can be in the retracted state respectively disengaged from the teeth 144 in the sleeve 142 of the axle coupling part 128. This retracted state of the clutching parts 132 is exemplarily illustrated in FIG. 9.

In conjunction with FIGS. 1, 3 and 4, FIG. 10 is a schematic view illustrating exemplary operation for lowering the bottom part 104 of the window shade 100. Referring to FIGS. 1, 3, 4 and 10, when a user wants to lower the bottom part 104, the control wand 168 can be gently rotated to drive a rotational displacement of the collar 164, which in turn causes a displacement of the prong 160B for loosening the braking spring 160. Accordingly, the transmission axle 112 and the axle coupling part 128 can rotate in unison as the bottom part 104 moves downward under gravity for expanding the shading structure 106. While the transmission axle 112 and the axle coupling part 128 rotate, the clutching parts 132 can remain in the retracted state, and the actuating wheel 122 and the carrier 130 can remain stationary. Once the bottom part 104 moving downward reaches a desired height, the control wand 168 can be released, and the braking spring 160 can tighten around the axle coupling part 128 to block rotation of the transmission axle 112 and the axle coupling part 128.

Figure 12:
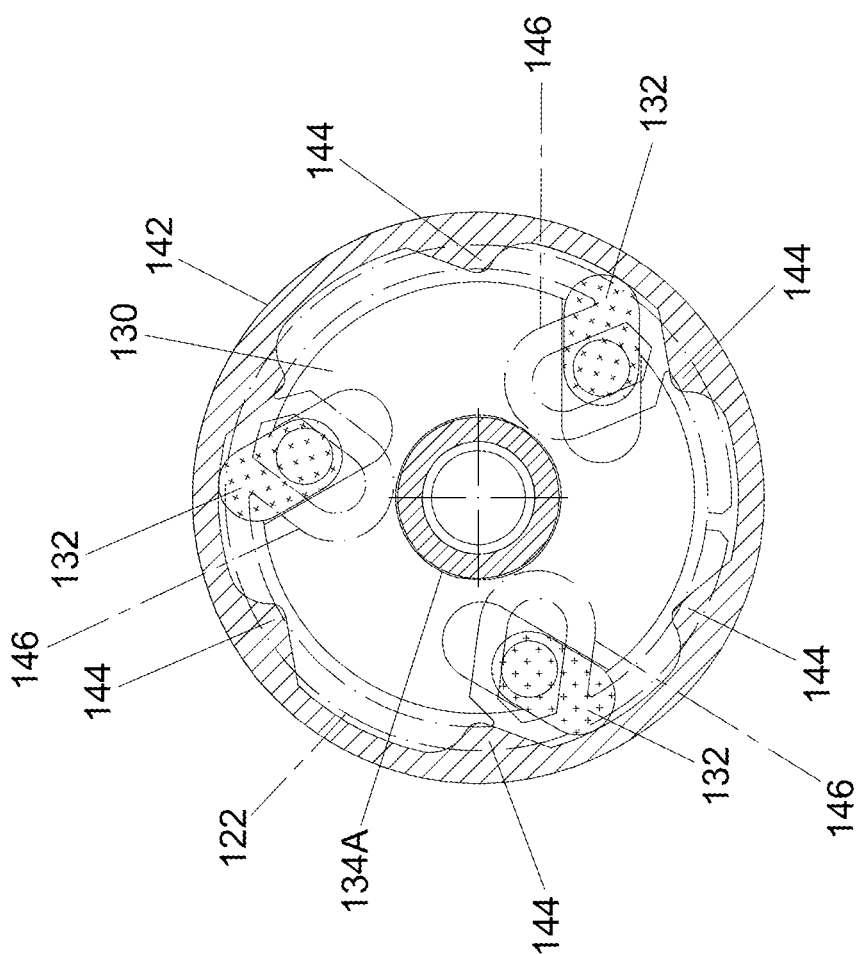
FIGS. 12-14 are partial cross-sectional views illustrating corresponding movements of some component parts in the control module when the bottom part of the window shade is raised.
Figure 13:
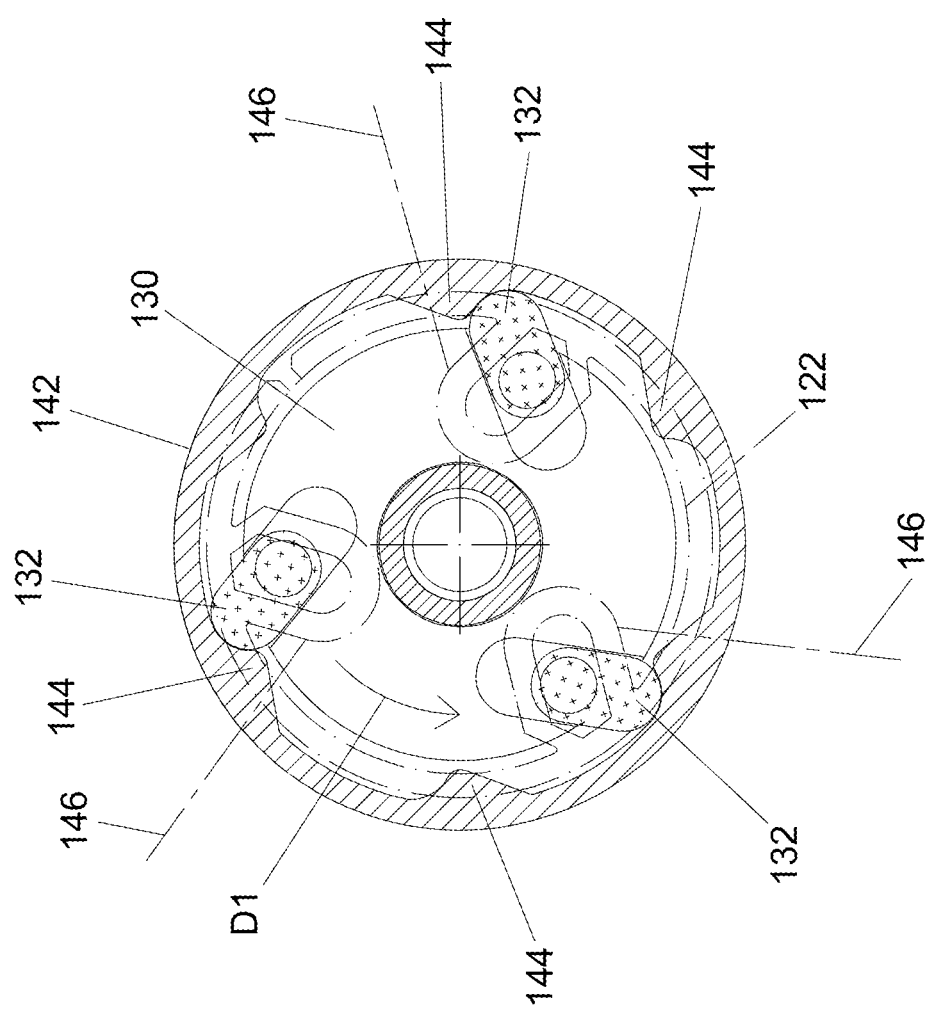
Figure 14:
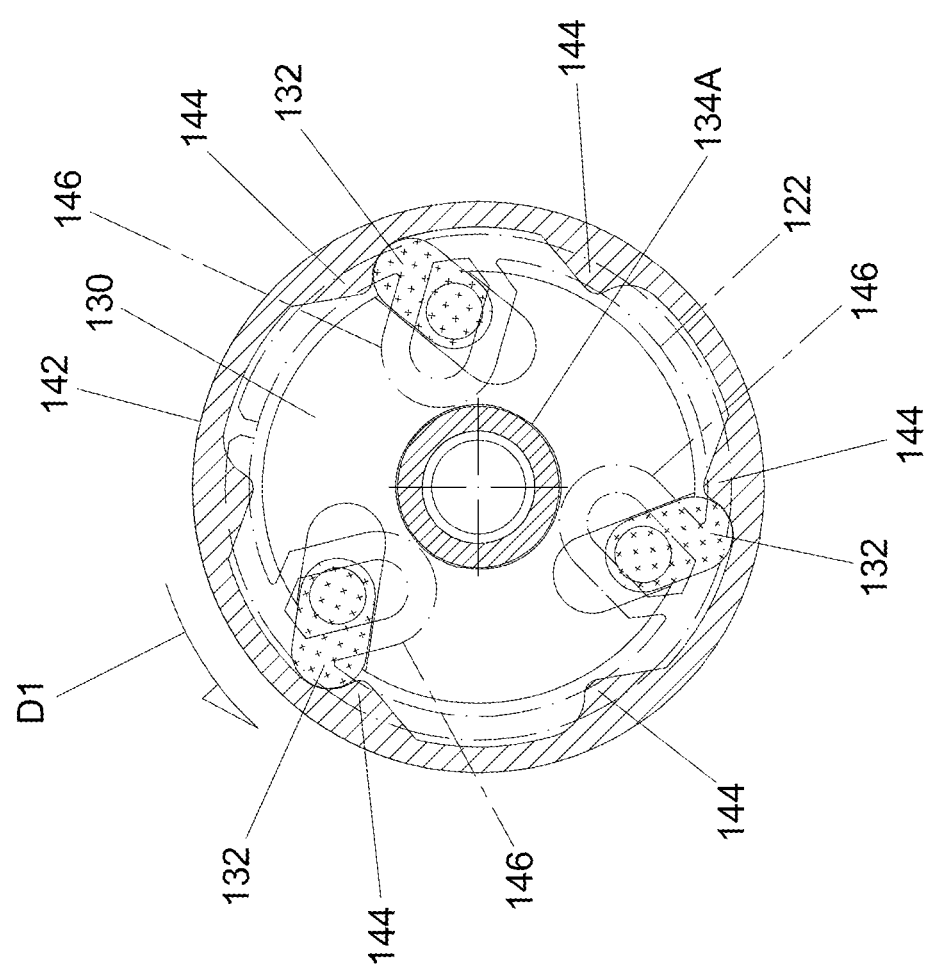
Figure 15:
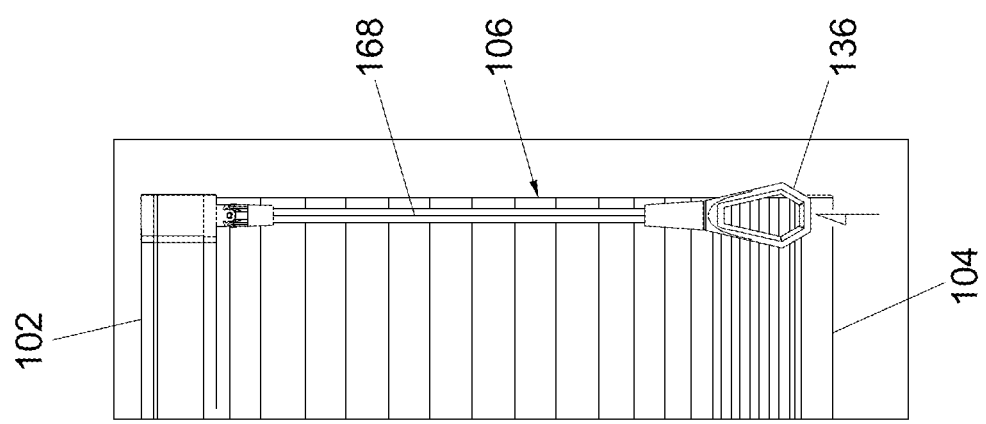
FIG. 15 is a schematic view illustrating the window shade after an operating element of the actuating system is extended and then released.

In conjunction with FIGS. 1 and 3-8, FIG. 11 is a schematic view illustrating exemplary operation for raising the bottom part 104, and FIGS. 12-14 are partial cross-sectional views illustrating corresponding movements of the actuating wheel 122, the sleeve 142 of the axle coupling part 128, the carrier 130 and the clutching parts 132. Referring to FIGS. 1, 3-8 and 11-14, a user can pull the handle 136 and the operating element 124 downward for raising the bottom part 104. As a result, the actuating wheel 122 can rotate in a first direction D1 so that the operating element 124 is at least partially unwound from the actuating wheel 122. This rotation of the actuating wheel 122 causes the clutching parts 132 to slide relative to the carrier 130 from the retracted state to the extended state, and also urge the carrier 130 to rotate in the same direction so that the clutching parts 132 in the extended state respectively engage with the teeth 144 in the sleeve 142 of the axle coupling part 128. As the actuating wheel 122 continuously rotates in the first direction D1, the carrier 130 and the axle coupling part 128 can thus concurrently rotate in the same direction along with the actuating wheel 122 with the clutching parts 132 respectively engaged with the teeth 144, wherein this rotation driven by the actuating wheel 122 can overcome the braking force exerted by the braking spring 160 on the axle coupling part 128. As a result, the transmission axle 112 rotationally coupled to the axle coupling part 128 can rotate and cause the winding units 114 to respectively wind the suspension elements 110 for raising the bottom part 104.

While the carrier 130 rotates with the actuating wheel 122 in the first direction D1, the flange surface 154A of the carrier 130 can push against the corresponding prong 152A of the resisting spring 152 so that the resisting spring 152 enlarges and loosens its frictional contact with the fixed shaft 134A. Accordingly, the resisting spring 152 can also rotate along with the carrier 130 and the actuating wheel 122 in the first direction D1 when the operating element 124 is pulled downward.

Figure 16:
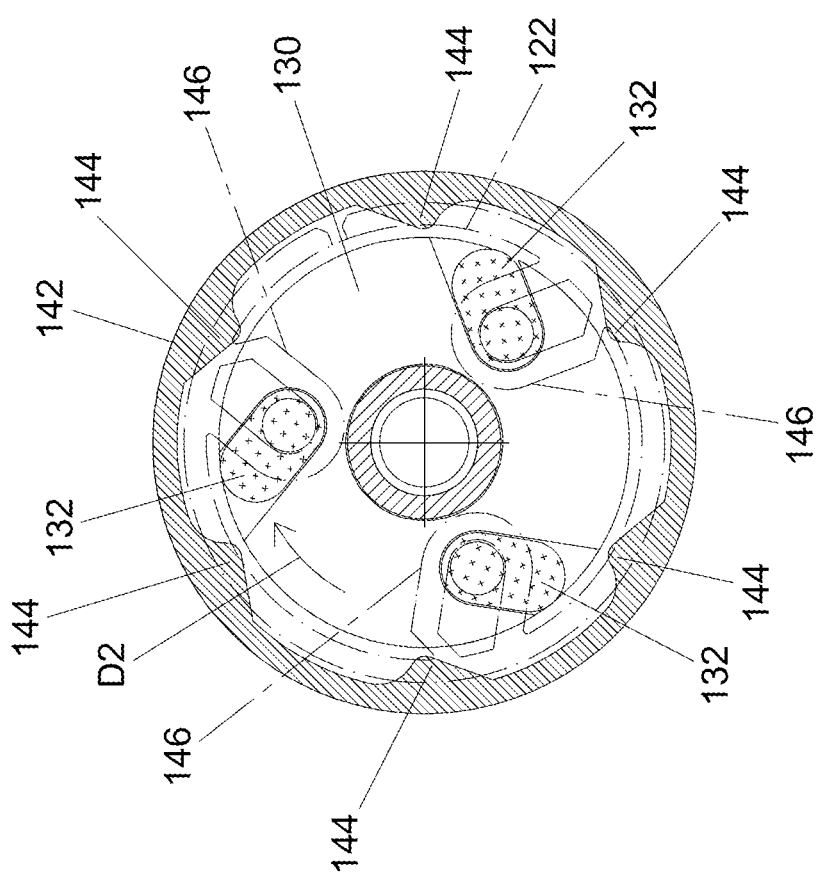
FIG. 16 is a cross-sectional view illustrating some component parts of the control module when the operating element is released after having been extended.

In conjunction with FIGS. 1, 3-8 and 11-14, FIG. 15 is a schematic view illustrating the window shade 100 after the operating element 124 is extended and then released, and FIG. 16 is a cross-sectional view illustrating the driving portions 146 of the actuating wheel 122, the sleeve 142 of the axle coupling part 128, the carrier 130 and the clutching parts 132 when the operating element 124 is released after having been extended. Referring to FIGS. 1, 3-8, 15 and 16, when the user releases the operating element 124 after the operating element 124 has been extended, the spring 126 can urge the actuating wheel 122 to rotate in a second direction D2 opposite to the first direction D1 for winding at least partially the operating element 124. This rotation of the actuating wheel 122 causes the clutching parts 132 to slide relative to the carrier 130 from the extended state to the retracted state. The clutching parts 132 can thereby respectively disengage from the teeth 144 in the sleeve 142 of the axle coupling part 128, and the actuating wheel 122 can be rotationally decoupled from the axle coupling part 128. Therefore, the axle coupling part 128 can remain stationary owing to the braking action of the braking spring 160 while the actuating wheel 122 rotates in the second direction D2 for winding the operating element 124.

The aforementioned steps of pulling and releasing the operating element 124 can be repeated one or more times until the bottom part 104 is raised to a desired position.

Advantages of the structures described herein include the ability to provide a window shade that has an actuating system operable to lower and raise a bottom part of the window shade in a convenient manner, wherein the actuating system includes multiple clutching parts movable to rotationally couple and decouple an actuating wheel with respect to an axle coupling part. The clutching parts can provide better rotational coupling so that the rotation of the actuating wheel can be effectively transmitted to the axle coupling part through the clutching parts.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
   an actuating wheel rotatable about a pivot axis and coupled to an operating element, wherein the actuating wheel is a single body, the operating element being at least partially wound around the actuating wheel and being operable to drive the actuating wheel in rotation;
   an axle coupling part disposed substantially coaxial to the actuating wheel, the axle coupling part being rotatable for raising or lowering a bottom part of the window shade; and
   a carrier rotatable about the pivot axis, and a clutching part carried with the carrier and disposed in contact with the actuating wheel so that the clutching part is movably linked to the actuating wheel, the clutching part being movable relative to the carrier between a retracted state for disengaging from the axle coupling part and an extended state for engaging with the axle coupling part;

wherein the actuating wheel is rotatable in a first direction to urge the clutching part to move from the retracted state to the extended state and drive the carrier and the axle coupling part to rotate in unison, and in a second direction opposite to the first direction to urge the clutching part to move from the extended state to the retracted state so that the actuating wheel is rotationally decoupled from the axle coupling part.

2. The actuating system according to claim 1, wherein the clutching part is respectively connected slidably with the carrier and the actuating wheel.

3. The actuating system according to claim 2, wherein the actuating wheel has a driving portion at an eccentric location, and the clutching part is slidably connected with the driving portion of the actuating wheel in a region distant from the pivot axis.

4. The actuating system according to claim 3, wherein the driving portion of the actuating wheel has a guide slot, and the clutching part has a pin slidably received in the guide slot.

5. The actuating system according to claim 4, wherein the carrier has a channel in which the clutching part is guided for sliding movement, and the guide slot overlaps at least partially with the channel.

6. The actuating system according to claim 5, wherein the channel extends along a first axis, and the guide slot extends along a second axis that is tilted an angle relative to the first axis.

7. The actuating system according to claim 1, wherein the axle coupling part includes a sleeve having a tooth protruding inward, the carrier and the axle coupling part being rotatable in unison with the clutching part engaged with the tooth.

8. The actuating system according to claim 7, wherein the carrier is at least partially received inside the sleeve of the axle coupling part, and the clutching part protrudes outward from a circumference of the carrier in the extended state for engaging with the tooth of the sleeve.

9. The actuating system according to claim 1, wherein the clutching part is disposed distant from the pivot axis.

10. The actuating system according to claim 1, wherein the carrier is pivotally connected about a fixed shaft having a circumference in contact with a resisting spring, a frictional contact of the resisting spring with the fixed shaft being loosened by a pressure applied by the carrier on a prong of the resisting spring as the carrier rotates along with the actuating wheel in the first direction.

11. The actuating system according to claim 1, wherein the operating element is a flexible element, and the actuating wheel is rotatable to wind and unwind at least partially the operating element.

12. The actuating system according to claim 11, wherein the operating element is at least partially unwound from the actuating wheel when the actuating wheel rotates in the first direction, and at least partially wound around the actuating wheel when the actuating wheel rotates in the second direction.

13. The actuating system according to claim 1, further including a spring connected with the actuating wheel, the spring biasing the actuating wheel to rotate in the second direction.

14. The actuating system according to claim 1, further including a braking spring disposed around the axle coupling part, and a brake release unit connected with a prong of the braking spring, the braking spring being in frictional contact with the axle coupling part to prevent rotation of the axle coupling part, and the brake release unit being operable to cause the braking spring to loosen the frictional contact with the axle coupling part.

15. The actuating system according to claim 14, wherein the brake release unit includes a collar connected with the prong of the braking spring, and a control wand connected with the collar via a plurality of transmission elements, the control wand being operable to cause the collar to rotate and thereby urge the braking spring to loosen the frictional contact with the axle coupling part.

16. The actuating system according to claim 1, further including a transmission axle rotationally coupled to the axle coupling part, and at least one winding unit that is coupled to the transmission axle and is connected with a suspension element.

17. A window shade comprising:
a head rail;
a shading structure and a bottom part suspended from the head rail; and
the actuating system according to claim 16, wherein the bottom part is connected with the suspension element.

* * * * *